Jan. 16, 1951     C. D. BLAIR     2,538,228
LATHE UNIT
Filed Nov. 29, 1946
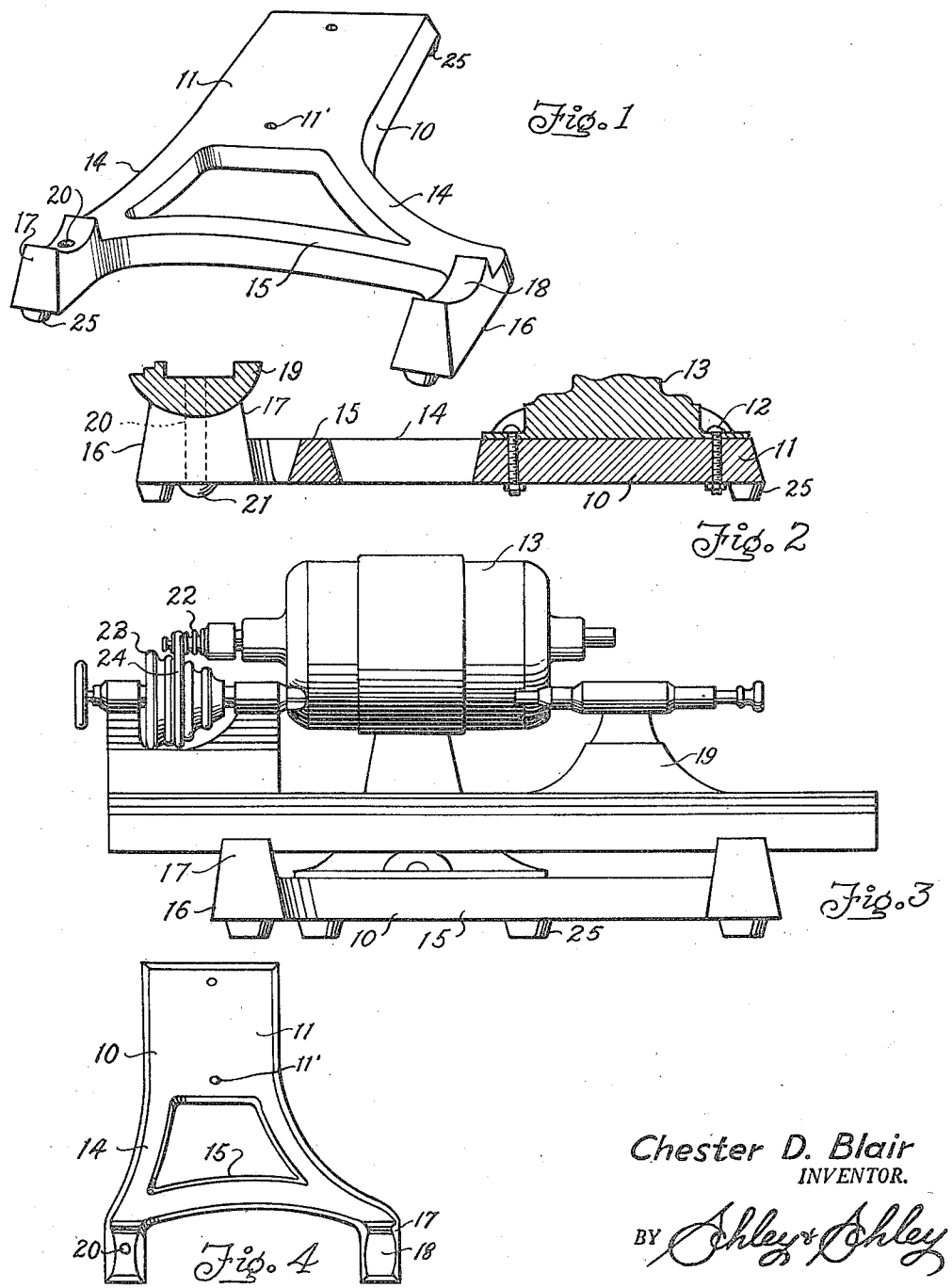
Chester D. Blair
INVENTOR.
BY Ohley & Ohley
ATTORNEYS Patented Jan. 16, 1951

2,538,228

UNITED STATES PATENT OFFICE 2,538,228

LATHE UNIT

Chester D. Blair, Lubbock, Tex.

Application November 29, 1946, Serial No. 713,056

2 Claims. (Cl. 248—19)

This invention relates to new and useful improvements in lathe units.

One object of the invention is to provide a small lathe unit, such as a jeweler's lathe, wherein the lathe and an electric driving motor are compactly mounted on a common base which is portable, whereby a unitized structure is provided which may be moved about and which may also be moved close to the face of the workman when supported on a bench so that a physically handicapped workman, in a sitting position, may easily and readily adjust the unit in accordance with his individual ailment requirments, whether it be visual or bodily.

A further object of the invention is to provide a small lathe and motor unit having a flat common base provided with supporting feet or bosses, whereby the base may be slid on a bench surface and the lathe adjusted to a desired working position with a minimum physical effort.

Another object of the invention is to provide a small lathe base having upstanding spaced lathe saddles at its front side and a flat motor platform at its rear side below said saddles with a sizeable opening therebetween, whereby a small lathe and an electric motor may be fastened on the saddles and platform in such positions as to give ample clearance for the lathe work, as well as making for convenient and efficient working conditions.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a perspective view of a lathe and motor base constructed in accordance with the invention, Fig. 2 is a longitudinal, sectional view of the base having a lathe and motor fastened thereon, Fig. 3 is a front elevation of a lathe and motor unit constructed in accordance with the invention, and Fig. 4 is a plan view of the base.

In the drawings, the numeral 10 designates, in general, a small flat lathe base. The base includes a flat rectangular motor platform 11 having suitably located holes 11', for receiving bolts 12, whereby the base of a small electric motor 13 may be fastened on said platform.

Outwardly and forwardly curved arms 14 extend from the platform and are merged into and connected by a transverse curved bridle bar 15; the arms and bar forming a yoke and having their upper surfaces lying in the same horizontal plane as the top surface of said platform.

At each end of the bridle bar, forward extensions 16 are provided and upstanding saddles 17 are formed integral with these extensions. The elements which have been described are integral with each other and constitute parts of the base. The saddles have arcuate seats 18 for receiving the curved underside of a small lathe, such as a jeweler's lathe 19. One of the saddles and its underlying extension, has a hole 20 so that a bolt 21 may be passed therethrough for fastening the lathe on the base.

The motor has a pulley 22 which drives the lathe pulley 23 by means of a belt 24. Since the pulley 23 is at one end of the lathe it is desirable to locate the motor so that the belt 24 may maintain substantial alinement with its pulley grooves. In order to accomplish this result, one of the arms 14 is given a considerably less degree of lateral curvature, than the other arm, thus the amplitude of curvature of one of the arms is much in excess of the amplitude of curvature of the other arm, whereby the platform is offset laterally with respect to the saddles.

The saddles 17 are high enough to support the lathe at the proper elevation, which is also controlled by the height of the bosses or feet 25, depending from the base. These bosses are short and have flat bottoms, whereby the base may be easily slid on the surface of a work bench. I preferably locate the bosses under the extensions 16 and at the rear corners of the platform.

It will be observed that the bridle bar 15 is given such a curvature that when the lathe 19 is mounted on the base sufficient clearance will be provided in rear of the lathe to give ample working space between the chuck and tailstock. Jewelers' benches are usually made high enough that when the unit is supported thereon, the work will be approximately in the horizontal line of vision of the average workman, when sitting at the bench.

While the weight of the unit is ample to hold it against displacement, due to vibration and to steady it, said unit may be easily slid to any desirable angular adjustment. The motor and lathe being fastened on the base, the unit is thus portable and may be transported from place to place and requires no fastening to hold it in position.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A small portable lathe support including, a flat one-piece base having a motor platform at its rear and a yoke extending forwardly of the base and having a curved bridle bar, upstanding lathe saddles at each end of the bridle bar offset laterally with respect to the platform, and short feet depending from the base, the platform and yoke being integral parts of the base.

2. A small portable lathe support including, a flat one-piece base having a motor platform at its rear and a yoke extending forwardly of the base, upstanding lathe saddles at each end of the yoke offset laterally with respect to the platform, and short feet depending from the base, the platform and yoke being integral parts of the base.

CHESTER D. BLAIR.

REFERENCES CITED

The following references are of record in the file of this patent:

UNITED STATES PATENTS

| Number | Name | Date |
|---|---|---|
| 1,344,168 | Brown | June 22, 1920 |
| 1,427,076 | Dilley | Aug. 22, 1922 |
| 1,822,500 | Muther | Sept. 8, 1931 |
| 2,090,818 | Stanley | Aug. 24, 1937 |
| 2,110,637 | Simmons | Mar. 8, 1938 |
| 2,418,332 | Burrows | Apr. 1, 1947 |